No. 798,512. PATENTED AUG. 29, 1905.
T. C. JOHNSON.
PIVOTAL CARTRIDGE CARRIER FOR BOTTOM LOADING GUNS.
APPLICATION FILED JAN. 19, 1905.
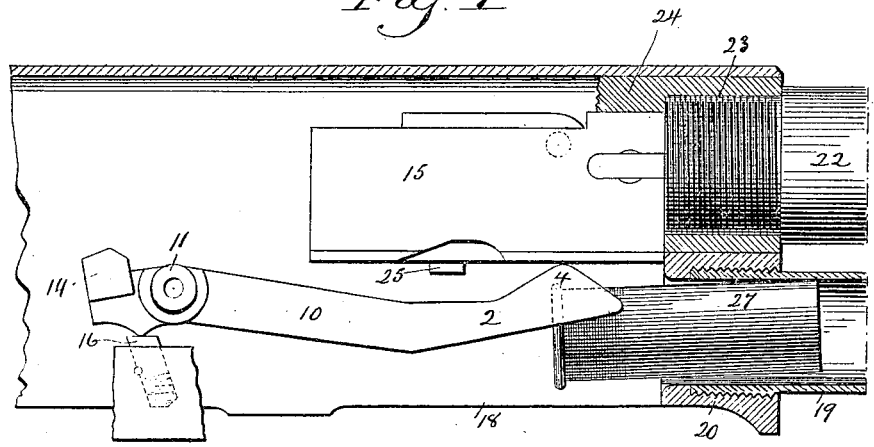
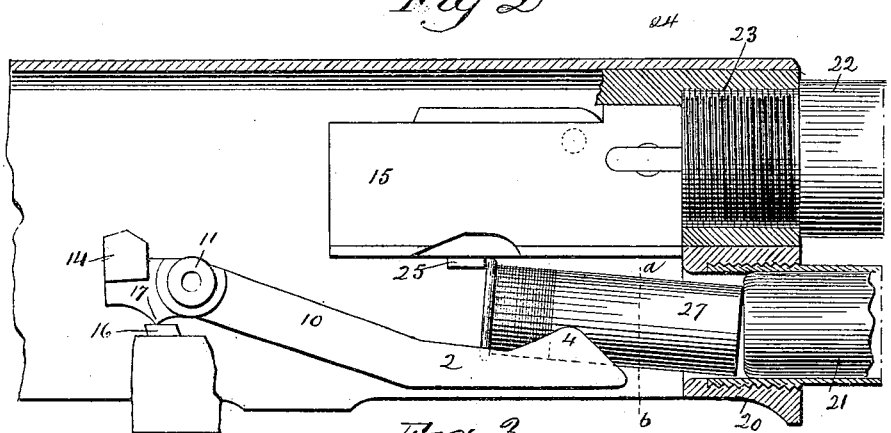
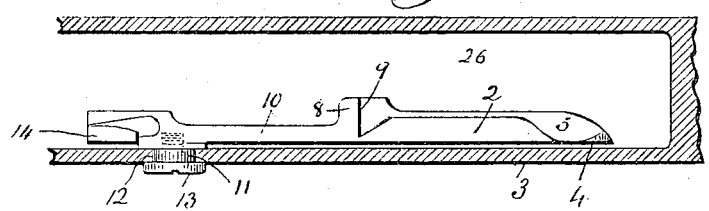

No. 798,512. PATENTED AUG. 29, 1905.
T. C. JOHNSON.
PIVOTAL CARTRIDGE CARRIER FOR BOTTOM LOADING GUNS.
APPLICATION FILED JAN. 19, 1905.
2 SHEETS—SHEET 2.
Fig. 4
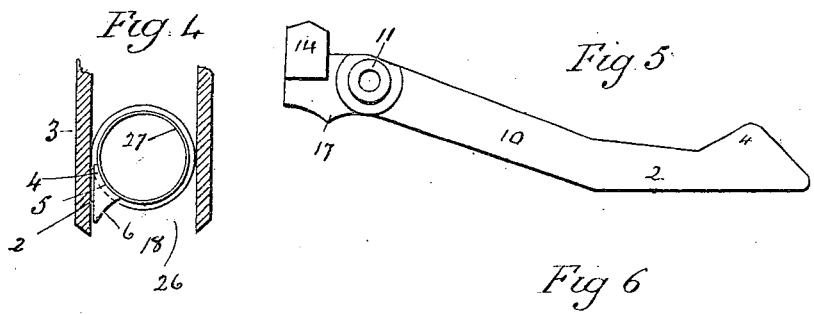
Fig. 5
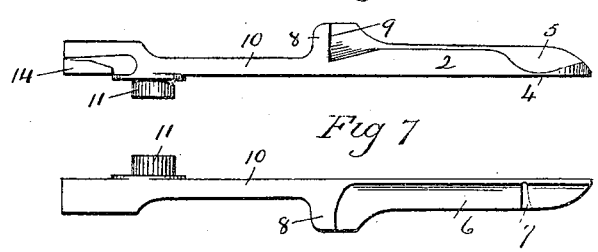
Fig. 6
Fig. 7
Fig. 8

UNITED STATES PATENT OFFICE.

THOMAS C. JOHNSON, OF NEW HAVEN, CONNECTICUT, ASSIGNOR TO WINCHESTER REPEATING ARMS CO., OF NEW HAVEN, CONNECTICUT, A CORPORATION.

PIVOTAL CARTRIDGE-CARRIER FOR BOTTOM-LOADING GUNS.

No. 798,512.     Specification of Letters Patent.     Patented Aug. 29, 1905.

Application filed January 19, 1905. Serial No. 241,730.

*To all whom it may concern:*

Be it known that I, THOMAS C. JOHNSON, a citizen of the United States, residing at New Haven, in the county of New Haven and State of Connecticut, have invented a new and useful Improvement in Pivotal Cartridge-Carriers for Bottom-Loading Guns; and I do hereby declare the following, when taken in connection with the accompanying drawings and the numerals of reference marked thereon, to be a full, clear, and exact description of the same, and which said drawings constitute part of this specification, and represent, in—

Figure 1, a broken view, in vertical longitudinal section, of a bottom-loading tubular-magazine firearm furnished with a pivotal cartridge-carrier constructed in accordance with my invention and shown as lifted into its magazine-charging position and the head of the cartridge engaged with its magazine-charging shoulder, whereby the carrier is maintained in its intermediate or magazine-charging position preparatory to introducing another cartridge into the magazine; Fig. 2, a corresponding view with the carrier in its depressed or cartridge-receiving position and with a cartridge shown as arrested by the cartridge-stop of the breech-block in its intermediate position in which it is partly engaged with the cartridge-carrier while its forward end remains in the magazine; Fig. 3, a broken view of the gun-frame in horizontal section looking down upon the carrier, which is shown in plan view; Fig. 4, a broken view, in vertical transverse section, on the line $a\,b$ of Fig. 2 and showing a cartridge resting upon the cartridge-lifting finger of my improved carrier; Fig. 5, a detached view, in side elevation, of my pivotal cartridge-carrier; Fig. 6, a plan view thereof; Fig. 7, a reverse plan view thereof; Fig. 8, a view showing the forward end of the cartridge-lifting finger thereof.

My invention relates to an improvement in pivotal cartridge-carriers for bottom-loading tubular-magazine firearms, particularly shotguns, the object of my present invention being to secure ample clearance-space for use in pushing a cartridge upon the carrier forward therefrom into the tubular magazine of the gun, so as to release the carrier and permit it to be lifted into its intermediate or magazine-charging position for the purpose of unloading the magazine or for introducing additional cartridges thereinto.

Further objects of my invention are to simplify and lighten the carrier, to reduce, if desired, the width of the gun-frame, and in general to secure economy of space in the arm.

With these ends in view my invention consists in the combination, with a gun-frame having a bottom-loading opening, of a tubular magazine and a pivotal cartridge-carrier having a cartridge-lifting finger arranged to form between one of its sides and one of the side walls of the said gun-frame a clearance-space through which a cartridge on the said finger may be pushed forward therefrom into the said tubular magazine.

My invention further consists in certain details of construction and combinations of parts, as will be hereinafter described, and pointed out in the claims.

In carrying out my invention as herein shown my improved pivotal cartridge-carrier is made in one piece and has an offset single forwardly-extending cartridge-lifting finger 2, virtually located on one side of the longitudinal axis of the gun-frame 3, the said finger being formed at its forward end with an upwardly-extending ear-like fender 4, the inner face of which is formed with a cartridge-receiving groove or concavity 5. The lower face of the said finger is formed with a longitudinal cartridge-receiving groove 6, intersected near its forward end by a transverse cartridge-loading shoulder 7. At its rear end the said finger 2 merges into an inwardly-extending abutment 8, formed with an abutment-shoulder 9, acting as a stop to limit the rearward movement of the cartridges upon the said finger 2 of the carrier. The said abutment 8 is located, so to speak, between the rear end of the finger 2 and the forward end of the carrier-shank 10, which is located in line with the said finger and provided at its rear end with an outwardly-projecting trunnion 11, entering a trunnion-hole 12 in the right-hand wall of the gun-frame 3. A large flat-headed screw 13, tapped into the trunnion 11, secures the carrier in place; but the particular manner of mounting it may of course be varied. The carrier may be operated in any approved manner—as, for instance, by its provision at its rear end with a carrier-elevator 14, coacting with the under side of the breech-bolt 15 for lifting the carrier, all as fully shown and described in Patent No. 768,665, granted on my application filed June 29, 1903. The depression of the carrier is effected, as shown, by the coaction of a spring-actuated plunger 16 with a nose 17, formed on the lower edge of the rear end of the shank 10 at a point to the rear of the trunnion 11. This is also explained in my prior patent just above referred to. Of course other means might be employed for elevating and depressing the carrier. The means shown and thus briefly described are offered merely as examples of how the carrier may be operated, such mechanisms not being directly concerned with my present invention. The gun-frame 3, sometimes called the "receiver," may also be of any approved construction, as long as it is formed in its bottom wall with a loading-opening 18 large enough to permit the cartridges to be fed upward through it and pushed forward into the tubular magazine 19, the rear end of which is threaded and screwed into a threaded socket 20, formed in the lower portion of the front end of the frame 3 in the usual manner. This tubular magazine is provided with a follower 21, operated by a follower-spring, which is not shown. The magazine 19 is located directly below and parallel with the gun-barrel 22, the rear end of which is threaded and screwed into a threaded socket 23, formed in the recoiling barrel extension 24, located in the upper portion of the gun-frame 3.

It has seemed unnecessary to show or describe the breech mechanism of the gun beyond the carrier which contains my present improvement and the breech-block 15, which may be of any approved construction—as, for instance, the construction shown in my prior patent hereinbefore referred to by number and date. The breech-block 15 is provided with a depending cartridge-stop 25, with which the heads of the cartridges engage when the block is in its closed position, at which time the cartridges are partially fed out upon the carrier so as to begin at once to move back with the block when the gun is opened into position to be lifted by the carrier up in front of the block preparatory to being loaded thereby into the gun-barrel.

By reference now to Figs. 3 and 4 of the drawings it will be seen that by forming the carrier with a single finger 2, offset to one side of the longitudinal axis of the gun-frame 3, I secure a very large clearance-space 26, which is formed between the inner edge of the said finger and the opposite side wall of the gun-frame and which is located above, though not directly above, the loading-opening 18 therein. This space is so large that it permits the user of the gun to put his finger or thumb up through the said opening and engage it with the head of a cartridge resting upon the finger 2 and then push the cartridge forward off the carrier into the tubular magazine 19, whereby the carrier is released from the position in which it is shown in Fig. 2 and left free to be lifted into its intermediate position, in which it is shown in Fig. 1. For example, the clearance-space 26 enables the user of the arm to employ his finger or thumb in pushing the partially-fed cartridge 27 forward off the finger 2 of the carrier and into the tubular magazine 19. This permits the carrier to be lifted into its intermediate or magazine-charging position, after which one or more cartridges may be loaded into the magazine, or, if desired, one or all of the cartridges in the magazine may be removed therefrom. The cartridges, it will be observed, are supported and guided not alone by the said finger of the carrier, but by the same in conjunction with the opposite side wall of the gun-frame. By forming the carrier with a single cartridge-lifting finger instead of with a spoon-like forward end the cost of producing it is not only reduced, but moves with more freedom, as its resistance to the air is reduced to the minimum. It also enables the width of the gun-frame to be reduced to the minimum and secures a great economy of space within the same for other parts of the breech mechanism, particularly if the carrier is formed, as shown, with a single trunnion and supported by one wall of the gun-frame.

While the user of the gun will probably employ his thumb or finger for pushing a cartridge off the carrier, as described, he may of course find it more convenient to use any convenient implement, such as a stick, a key, or a knife-blade.

It is apparent that my improved cartridge-carrier may as to its details of construction be made in a variety of ways other than that shown and described herein. I would therefore have it understood that I do not limit myself thereto, but hold myself at liberty to make such departures therefrom as fairly fall within the spirit and scope of my invention.

Having fully described my invention, what I claim as new, and desire to secure by Letters Patent, is—

1. The combination with a gun-frame having a bottom-loading opening, of a tubular magazine, and a pivotal cartridge-carrier consisting of an eccentrically-arranged cartridge-lifting finger forming between one of its sides and one of the side walls of the said gun-frame, an unobstructed clearance-space through which a cartridge on the said finger may be pushed forward therefrom into the said tubular magazine.

2. The combination with a gun-frame having a bottom-loading opening, of a tubular magazine, and a pivotal cartridge-carrier consisting of an eccentrically-arranged cartridge-lifting finger forming between it and the opposite side wall of the gun-frame, an unobstructed clearance-space through which a cartridge on the said finger may be manually pushed forward therefrom into the said tubular magazine.

3. The combination with a gun-frame having a bottom-loading opening, of a tubular magazine, and a pivotal cartridge-carrier consisting of an eccentrically-arranged single cartridge-lifting finger located wholly on one side of the longitudinal axis of the said gun-frame to form between it and the opposite side wall thereof, an unobstructed clearance-space through which a cartridge on the said finger may be manually pushed forward therefrom into the said tubular magazine.

4. The combination with a gun-frame having a bottom-loading opening, of a tubular magazine, and a pivotal cartridge-carrier having a single trunnion mounted in one of the side walls of the said gun-frame and having a single cartridge-lifting finger arranged to form between one of its sides and one of the side walls of the said gun-frame, an unobstructed clearance-space through which a cartridge on the said finger may be manually pushed therefrom into the said tubular magazine.

5. The combination with a gun-frame having a bottom-loading opening, of a tubular magazine, and a pivotal cartridge-carrier having a single cartridge-lifting finger and formed with a single shank connected by a single trunnion with one of the side walls of the said gun-frame, the said finger being arranged to form between it and one of the side walls of the said gun-frame, an unobstructed clearance-space through which a cartridge on the said finger may be manually pushed therefrom into the said tubular magazine.

In testimony whereof I have signed this specification in the presence of two subscribing witnesses.

THOMAS C. JOHNSON.

Witnesses:
DANIEL H. VEADER,
WALTER M. THOMPSON.